(12) United States Patent
Page et al.

(10) Patent No.: US 7,315,037 B1
(45) Date of Patent: Jan. 1, 2008

(54) INFRARED IDENTIFICATION DEVICE

(75) Inventors: David J. Page, Painesville, OH (US); Brian M. Spahnie, Brunswick, OH (US)

(73) Assignee: Lumitex, Inc., Strongsville, OH (US)

( * ) Notice: Subject to any disclaimer, the term of this patent is extended or adjusted under 35 U.S.C. 154(b) by 38 days.

(21) Appl. No.: 11/325,180

(22) Filed: Jan. 4, 2006

(51) Int. Cl.
*G08B 1/00* (2006.01)

(52) U.S. Cl. .............................. 250/504 R; 250/493.1; 250/495.1; 116/7; 116/42; 340/983; 362/103; 362/190

(58) Field of Classification Search ..................... None
See application file for complete search history.

(56) References Cited

U.S. PATENT DOCUMENTS 5,414,405 A * 5/1995 Hogg et al. ................. 340/321
6,030,089 A 2/2000 Parker et al.
2005/0084975 A1 * 4/2005 Armentrout et al. .......... 436/56
2005/0178947 A1 * 8/2005 Sasaki et al. ............. 250/208.1

OTHER PUBLICATIONS

Photon Infrared Flashlights product literature (2 pages) dated 2003 (enclosed).
Push Button Operated Flashlight With Infra Red LED product literature (1 page) dated Dec. 13, 2004 (enclosed).

* cited by examiner

*Primary Examiner*—Jack I. Berman
*Assistant Examiner*—Zia R. Hashmi
(74) *Attorney, Agent, or Firm*—Renner, Otto, Boisselle & Sklar, LLP

(57) ABSTRACT

An infrared identification device includes a light emitting panel member that receives light from an infrared light source for conduction within the panel member and emission from a light emitting surface area on one side of the panel member, which is relatively easy to detect at night when viewed through night vision equipment. The device may be capable of functioning in an interrogation mode, allowing the device to be activated remotely by a predetermined signal frequency, code signal or pulse signal and send out a signal response.

32 Claims, 4 Drawing Sheets

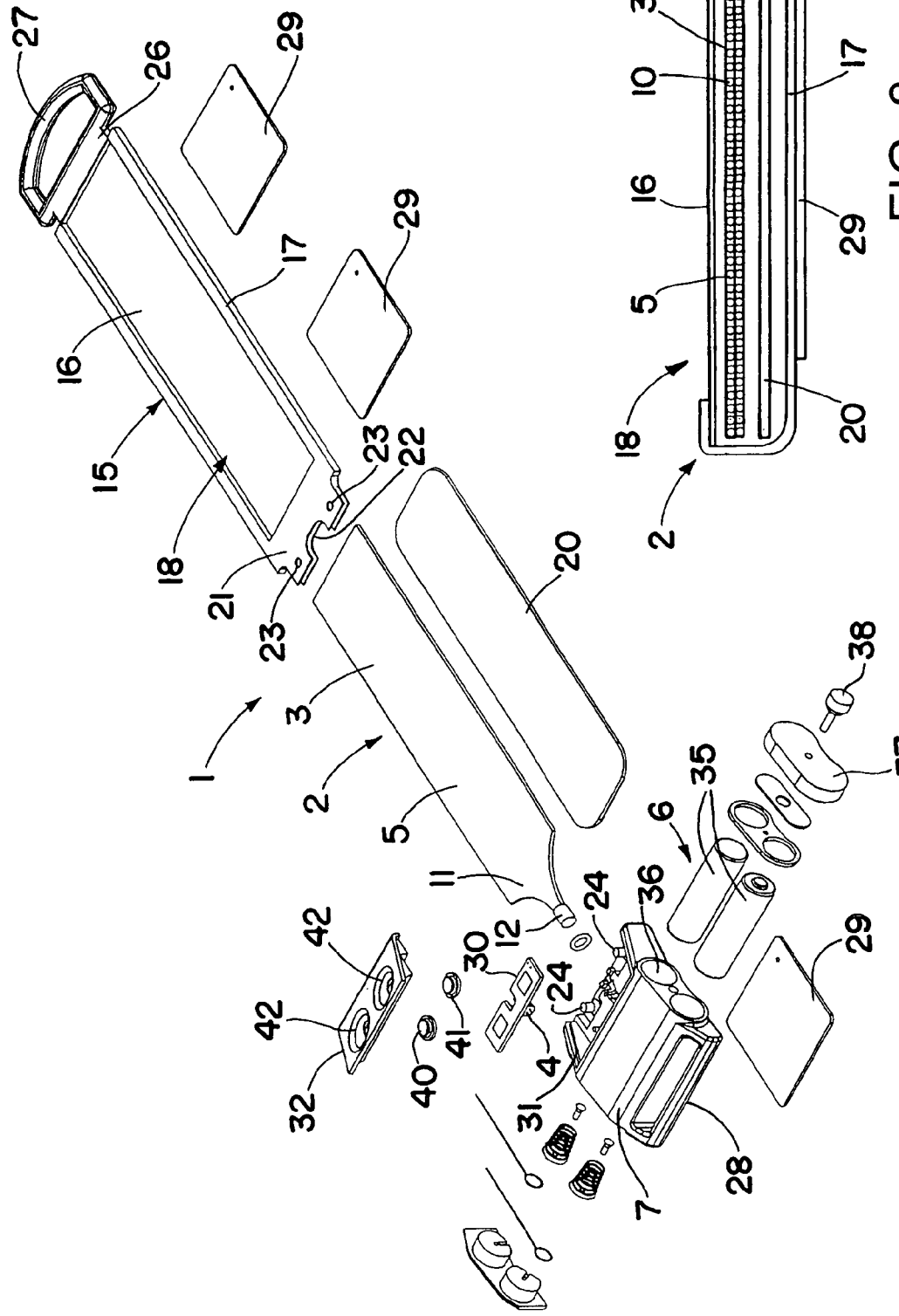
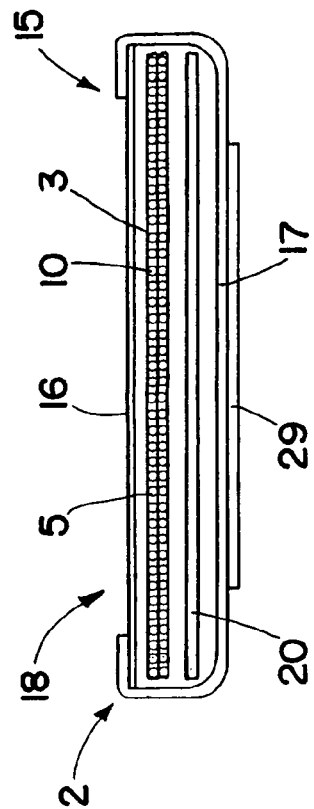
FIG. 2
FIG. 3

INFRARED IDENTIFICATION DEVICE

FIELD OF THE INVENTION

This invention relates generally to an infrared identification device that allows for easy identification of friendly troops or law enforcement personnel, objects or positions at night using night vision equipment.

BACKGROUND OF THE INVENTION

Night vision equipment is commonly used by the military when carrying out night operations. However, even with night vision equipment it is oftentimes difficult for ground troops and air support to identify friendly troops as well as objects such as equipment or positions and the like at night.

Infrared flashlights have been used to make it somewhat easier to identify friendly troops at night using night vision equipment. However, infrared flashlights have the objection that they give off a narrow beam of infrared light that can only be seen in one direction through night vision equipment, making it difficult to pick up with night vision equipment. Also such infrared flashlights are very limited in the type of signals that they can emit. Moreover, they are not capable of functioning in an interrogation mode allowing them to be activated remotely by a predetermined signal frequency, code signal or pulse sequence or the like and send out an appropriate signal response.

SUMMARY OF THE INVENTION

The present invention relates to an infrared identification device that allows for easy recognition, identification and tracking of friendly troops or law enforcement personnel at night when viewed through night vision equipment. Also the device may be used to identify objects or positions at night.

In accordance with one aspect of the invention, the device includes a light emitting panel having a relatively large surface area for emitting infrared light received from an infrared light source, making it relatively easy to detect at night when viewed through night vision equipment.

In accordance with another aspect of the invention, the device is flexible and lightweight for ease of attachment to a person or a person's clothing, gear or equipment in a variety of configurations. Also the device is water resistant and durable.

In accordance with another aspect of the invention, the panel member may be formed into different three-dimensional shapes for easier viewing at night from different directions through night vision equipment.

In accordance with another aspect of the invention, the device may include a controller for controlling operation of the device.

In accordance with another aspect of the invention, the controller may provide different operating modes for the light source.

In accordance with another aspect of the invention, the controller may be programmable to permit the device to emit different infrared light patterns including custom blinking patterns.

In accordance with another aspect of the invention, the device may include one control button for turning the light source on and selecting different brightness modes of the light source, and another control button for selecting a constant on mode or different blinking modes of the light source in any of the brightness modes.

In accordance with another aspect of the invention, either or both of the control buttons may be used to turn the light source off by pressing the control buttons for a predetermined time interval.

In accordance with another aspect of the invention, the device may be used to both send and receive infrared signals.

In accordance with another aspect of the invention, the device may be capable of functioning in an interrogation mode, allowing the device to be activated remotely by a predetermined signal frequency, code signal or pulse signal and send out an appropriate identifying signal.

In accordance with another aspect of the invention, the device may include a detector for detecting a predetermined incoming signal to activate the device and cause the device to emit a signal response.

In accordance with another aspect of the invention, the detector may be an infrared detector that detects infrared light picked up by the panel member from an external source when the device is turned off.

In accordance with another aspect of the invention, the device may include a visual indicator lamp that mimics different output modes of the light source.

In accordance with another aspect of the invention, the visual indicator lamp may also function as a low power source indicator by emitting a different visual signal than the signal mimicking the different output modes of the light source when the remaining life of the power source drops below a predetermined level.

In accordance with another aspect of the invention, the device may include a protective fabric cover that protects the panel member against abrasion and includes a fabric layer overlying the light emitting surface area of the panel member that allows infrared light rays to penetrate without significant loss.

In accordance with another aspect of the invention, the protective fabric cover may include another fabric layer that covers the back side and side edges of the panel member to block out infrared light rays and may overlap opposite side edges of the fabric layer overlying the light emitting surface area to form a window that is easily penetrated by infrared light rays.

In accordance with another aspect of the invention, a housing for the infrared light source, power source and controller may be connected to one end of the protective fabric cover.

In accordance with another aspect of the invention, a flexible back reflector may be located within the protective fabric cover adjacent the opposite side of the panel member.

In accordance with another aspect of the invention, a plurality of such panel members may be arranged in the shape of a marker on one side of a mat and lighted by infrared light sources adjacent one or both ends of the panel members to allow for easy identification of objects or positions at night marked by the mat when viewed through night vision equipment.

These and other objects, advantages, features and aspects of the invention will become apparent as the following description proceeds.

To the accomplishment of the foregoing and related ends, the invention, then, comprises the features hereinafter more fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

FIG. 2 is an exploded perspective view of the infrared identification device of FIG. 1.

FIG. 3 is an enlarged schematic transverse section through the device of FIG. 1, taken generally along the plane of the line 3-3 thereof.

DETAILED DESCRIPTION OF THE INVENTION

Figure 1:
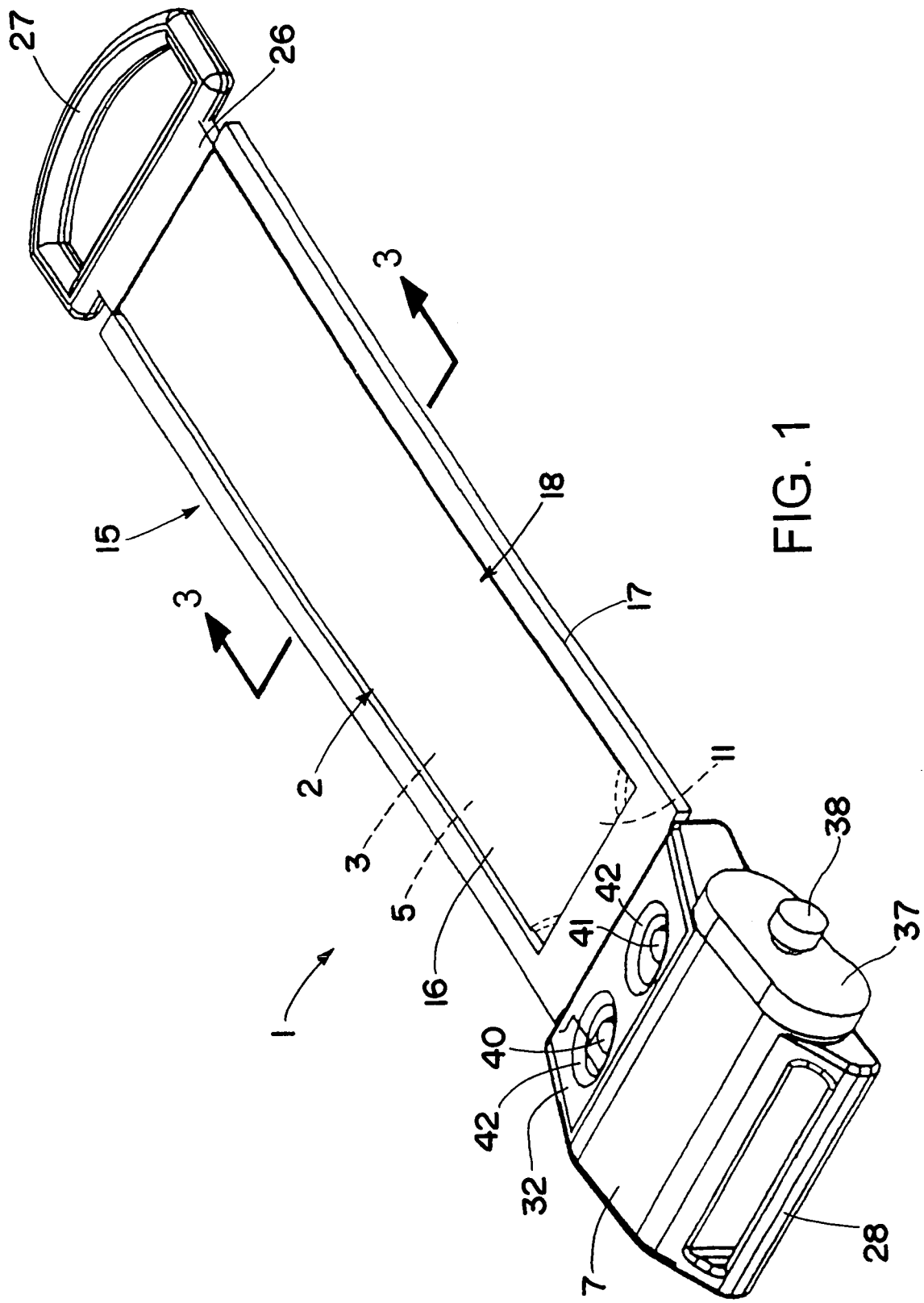
FIG. 1 is a perspective view of one form of infrared identification device in accordance with this invention.

Referring now in detail to the drawings, wherein like reference numerals are used to designate like parts, and initially to FIGS. 1-3, there is shown one form of infrared identification device 1 in accordance with this invention comprising an assembly 2 including a light emitting panel member 3 for receiving infrared light from an infrared light source 4 for conduction within the panel member and emission from a light emitting surface area 5 on a side of the panel member. Both the light source 4 and a suitable power source 6 to power the light source may be contained in a housing 7 suitably attached to one end of the assembly 2. A controller may also be contained within the housing for controlling operation of the device as described hereafter.

Light emitting panel member 3 may be comprised of one or more layers of woven or non-woven optical fibers 10 (see FIG. 3) each having a light transmitting core portion made of a suitable optically transparent material such as glass or plastic having the desired optical characteristics and flexibility. Surrounding the core portion is an outer sheath or cladding having an index of refraction that is different from that of the core material, whereby substantially total internal reflection is obtained at the core-cladding interface, as well known in the art.

The ends of the optical fibers 10 may be brought together to form a tail portion 11 having a connector 12 surrounding the outermost ends of the fibers which serves as an interface between the light source 4 and panel member 3. The light emitting surface area 5 of panel member 3 is larger than the cross sectional area of the bundled outermost ends of the fibers to reduce energy density by spreading the light over the larger light emitting surface area of the panel member.

To cause conducted light to be emitted from the light emitting surface area 5 of the panel member 3, the external surface of the optical fibers may be disrupted or deformed along their length as by roughening, marring, abrading, etching, grit blasting or thermally deforming one or both sides of the optical fibers. Alternatively, light may be caused to be emitted from the optical fibers by weaving the optical fibers to produce bends in the optical fibers that cause a percentage of the light to escape at the bends. If desired, the light emitting panel member may also be made of a solid transparent material having disruptions or deformities on one or both sides for causing light entering the panel member to be emitted from the light emitting surface area. The amount of light emitted from the light emitting surface area will depend on the depth and frequency of the disruptions or bends. If the panel member is deformed or bent at decreasingly spaced intervals as the distance from the light source increases, there will be a more uniform emission of infrared light from the light emitting surface area.

To protect the panel member 3 against possible abrasion and still permit the panel member to be flexed into a variety of different configurations for ease of looping around a person's arm or shoulder or attachment to a person's clothing, gear or other equipment, the panel member may be contained in a protective fabric cover or pouch 15 including a relatively thin fabric layer 16 overlying the light emitting surface area 5 of the panel member that allows infrared light rays to penetrate without significant loss. The rest of the protective fabric cover 15 may comprise a heavier fabric layer 17 that covers the opposite side and opposite side edges of the panel member to block out infrared light rays. Opposite side edges of the heavier fabric layer 17 may overlap opposite side edges of the thinner fabric layer 16 where the two fabric layers may be secured together as by stitching or using a suitable adhesive to form a relatively large window 18 through which infrared light rays emitted by the light emitting surface area 5 of the panel member may be emitted. One such fabric that has been found to be suitable for this purpose is a urethane coated 400 denier nylon fabric having a fabric layer thickness of approximately 0.014 inch overlying the light emitting surface area and a fabric layer thickness of approximately 0.023 inch overlying the other surface areas of the panel member. Also the thicker fabric layer 17 may be black in color, and the thinner fabric layer 16 may be tan.

A flexible reflective member 20 may be placed inside the fabric cover 15 adjacent the back side of the panel member to act as a back reflector and to allow flexure of the panel member along its length.

One end 21 of the fabric cover 15 is open for insertion of the panel member 3 and back reflector 20 inside the fabric cover. A generally U-shaped notch 22 may be provided in such open end for receipt of the connector 12 at the light input end of panel member 3 to expose the light input end to the light source 4 within the housing 7. Also a pair of holes 23 may be provided in such open end adjacent opposite sides of the notch 22 for hooking over posts 24 in the housing to secure the open end of the fabric cover to the housing with the connector in close proximity to the light source within the housing.

The other end 26 of the fabric cover 15 may be looped through a D ring 27 and secured to itself for attaching the D ring to the other end of the fabric cover. Another D ring 28 may be on the housing 7 to provide connection points at both ends of the device, and to allow the device to be looped around a person's arm or shoulder as by tying the two D rings together using zip ties or elastic straps or the like. Patches of hook type fasteners 29 may be attached to the back side of the housing 7 and/or to the fabric layer 17 to permit the device to be attached to loop type fasteners on clothing, combat gear or equipment and the like.

The infrared light source 4 may be one or more infrared light emitting diodes. One such infrared light source 4 is shown in FIG. 2 mounted on the underside of a circuit board 30 which may be received in a recess 31 in the housing 7 and held in place by a lid 32 overlying the circuit board. Other infrared light sources may also be effectively used for providing infrared light to the light emitting panel member if desired.

A battery of any suitable type may be used as the power source 6. FIG. 2 shows two M batteries 35 receivable in a battery compartment 36 closable at one end by a battery cover 37 held in place by a thumbscrew 38. To replace the batteries, the battery cover 37 may be removed by hand loosening the thumbscrew 38 and then replaced by hand tightening the thumbscrew.

Various modes of operation of the device 1 may be controlled by selectively pressing a pair of control buttons 40 and 41 accessible through openings 42 in the housing lid 32. One of the control buttons 40 may be used to cycle the light source 4 from an off position to different brightness modes of the light source each time the button is pressed. For example, the light source may be cycled between a high brightness mode which may typically be used for interaction with aircraft or command and control over relatively long distances (e.g., between 200 and 5,000 yards); a medium brightness mode which may typically be used for ground troop coordination and interaction over medium distances (e.g., 25 to 200 yards); and a low brightness mode which may typically be used for close in operations (e.g., of less than 25 yards). The other control button 41 may be used to cycle the light source between a constant on mode and different blinking modes each time the button is pressed, for example, a fast blinking mode or a slow blinking mode. Blinking modes will extend the battery life and make it easier for friendly forces to pick out the infrared signal emitted by the device over background clutter of other infrared light sources.

Emergency shutdown of the device 1 may be achieved by pressing either or both control buttons 40 and 41 for a somewhat longer period of time, for example, 1.2 seconds. Also, an emergency shutoff button 43, schematically shown in FIG. 4, may be provided for causing emergency shutdown of the device when pressed.

Figure 4:
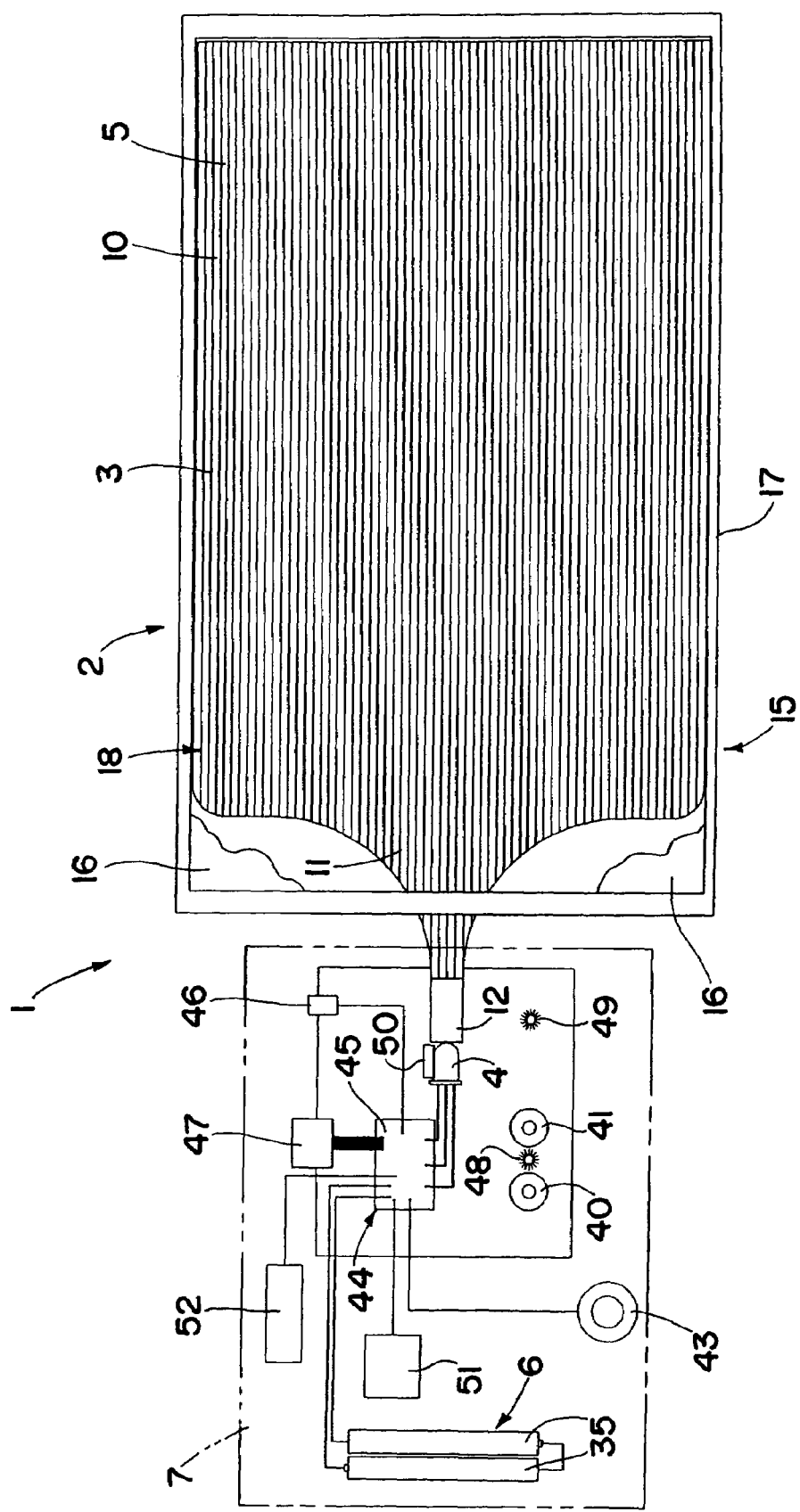
FIG. 4 is a schematic plan view of circuitry for controlling the operation of the device of FIGS. 1-3.

The various operating modes of the device may be controlled by a suitable controller 44 such as a microprocessor 45, also schematically shown in FIG. 4. Microprocessor 45 may be programmable from an external unit through a receiver 46 or through a direct connection port 47, schematically shown in FIG. 4, to cause the light source 4 to emit different light patterns including custom blinking patterns that cause the light source to blink at different rates or frequencies. These and other modes of operation of the device could be made available using the same two control buttons 40 and 41 or other control buttons. However, it might be more advantageous to reprogram the device rather than have more modes to select from because of the requirement to step through all of the modes in some predetermined order, except when turning the device off by pressing one or both buttons for a predetermined longer time interval.

The device may include a self-diagnostics feature in the circuitry to monitor the current to the light source to verify that the light source is on and to turn the device off if the current goes above or drops below a set limit. Also, a visual indicator lamp 48 such as a red light, schematically shown in FIG. 4, may be visible externally of the housing 6 to provide a visual aid in determining what mode the device is in when switching between different modes. This may be done by causing the visual indicator lamp to mimic the different output modes of the light source, for example, by slightly changing its brightness to reflect which brightness mode the light source is in, and by being continuously on or blinking at the same rate as the light source. This same indicator lamp 48 may also function as a low battery indicator by emitting a different visual signal than the signals mimicking the different operating modes of the light source when the remaining battery life drops below a predetermined level. For example, when there is approximately 10% or less of the battery life remaining, the indicator lamp 48 may blink at a much faster rate than during the fast blink mode. Alternatively, a separate low battery visual indicator lamp 49, also schematically shown in FIG. 4, may be provided.

Device 1 may also be capable of functioning in an interrogation mode, allowing the device to be turned on remotely by infrared or radio frequency interrogation, which may be encrypted. This may be accomplished, for example, by friendly troops using a directional antenna mounted on night vision equipment, a rifle scope, or a spotlight. If the interrogation signal is an infrared signal, the panel member 3 may be illuminated by the infrared signal and detected by an infrared detector 50 adjacent the connector 12 at the input end of the panel member as schematically shown in FIG. 4. Alternatively, a separate infrared detector 51, also schematically shown in FIG. 4, may be used directly to detect an incoming infrared signal during the interrogation mode. However, because the panel member has a relatively large surface area, it would be easier to detect infrared illumination of the panel member than for an infrared detector directly to detect an incoming infrared signal. A radio frequency detector 52, schematically shown in FIG. 4, may also be provided for detecting a radio frequency signal during the interrogation mode. When an appropriate signal of predetermined sequence, frequency or code is received while the device is in the interrogation mode, the microprocessor 45 may cause the light source to emit an identifying signal, which may, for example, be a custom blinking mode that is unique to a particular combat unit or the like.

The device may also contain encryption, interrogation, timed lockout, and/or wireless activation features to protect against the device being used in the event that it should fall into the enemy's hands. Also an overlay with predetermined letters and numbers may be placed over the light emitting surface area of the panel member to designate friendly units.

Although the dimensions of the device 1 may vary within certain limits, by way of example, the device may have an overall length of approximately 12 inches and the panel member 2 may have a thickness of approximately 0.050 inch, a length of approximately 7 inches and a width of approximately 1.7 inches, with a light emitting surface area 5 (which may include the tail portion 11) that is visible through window 18 of at least 4 inches by 1.5 inches. The back reflector 20 may have a thickness of approximately 0.020 inch. Because the panel member, back reflector and protective cover are all flexible, the assembly 2 can take three-dimensional shapes, making it easier to detect infrared light signals emitted by the light emitting surface area of the panel member at night when viewed through night vision equipment and to pick up incoming infrared signals when in an interrogation mode.

Figure 5:
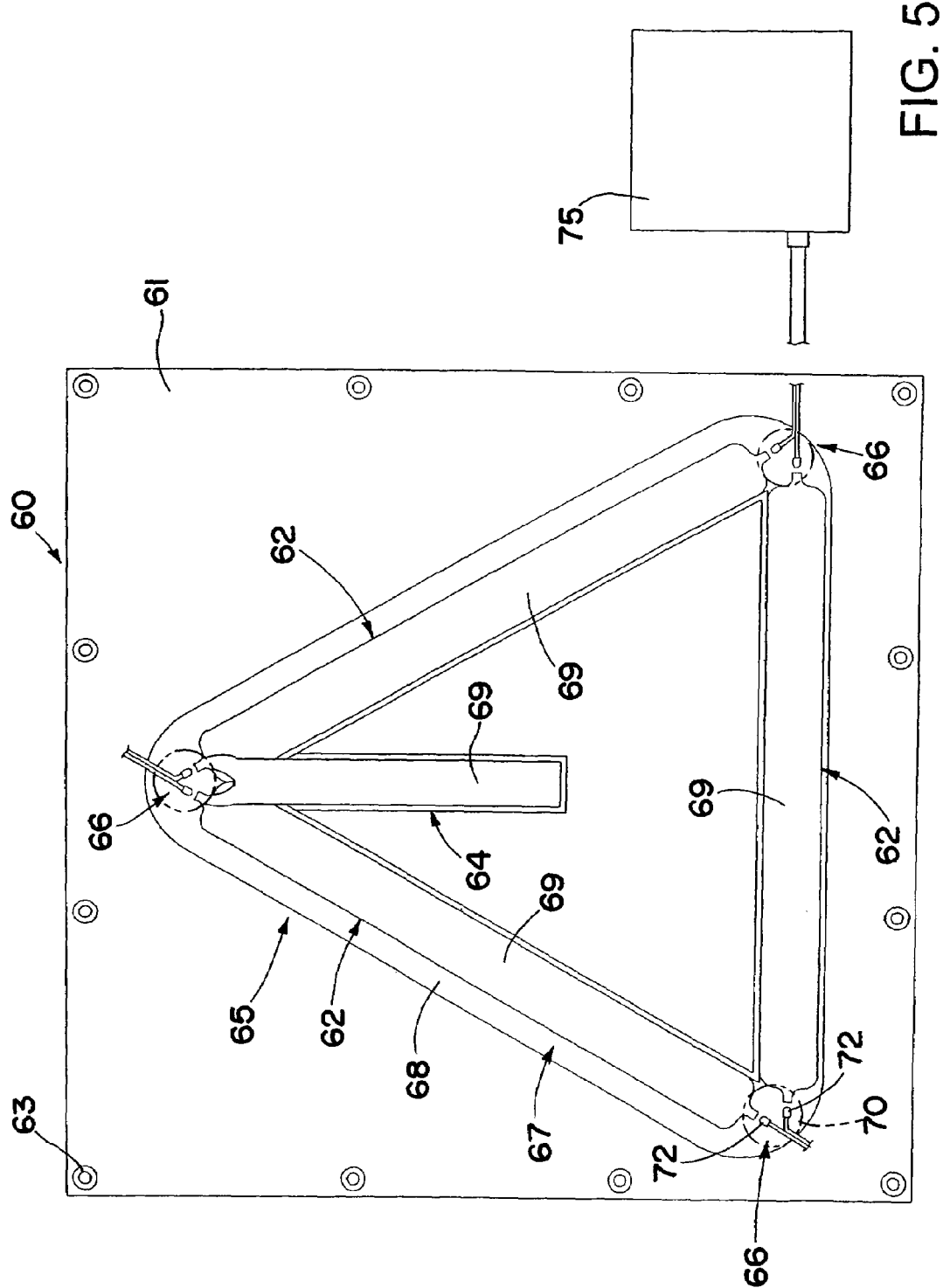
FIG. 5 is a schematic plan view, partly in section, of another form of infrared identification device in accordance with this invention.

FIG. 5 shows another infrared identification device 60 in accordance with this invention incorporated into a mat 61 that may be placed wherever desired for use as a marker to allow for easy identification of objects or positions at night when viewed through night vision equipment. In this embodiment, three infrared light emitting panel members 62 are arranged in a triangular shape on one side of the mat, which may, for example, be 36 inches by 36 inches, and have tie down grommets 63 along the edges to facilitate securing the mat in place. In addition, a shorter infrared light emitting panel member 64 is shown extending inwardly from one of the corners of the triangle 65 formed by the panel members 62 to provide a directional arrow. However, it should be understood that any number of panel members may be arranged wherever desired on the mat for use as a marker.

All of the panel members 62, 64 and their associated infrared light sources 66 may be secured in place by attaching a protective fabric cover 67 to the mat in overlying relation to the panel members and light sources. The portions 68 of the protective cover overlying the light emitting surface areas 69 of the panel members may be made of a suitable fabric material that protects the panel members against abrasion and allows infrared light to penetrate without significant loss, similar to the fabric cover layer 16 of the FIGS. 1-4 embodiment. Heavier fabric patches 70 or the like, shown in phantom lines in FIG. 5, may be placed over the infrared light sources 66 to block out infrared light rays so the light sources are not visible by night vision equipment.

One or more infrared light sources 66 may be located adjacent one or both ends of the panel members for transmission of infrared light from the light sources through the panel members for emission from the light emitting surface areas. In the embodiment shown in FIG. 5, two infrared light emitting diodes 72 are provided adjacent each corner of the triangle 65 for directing infrared light into the respective ends of the longer panel members 62. The optical fiber ends at one end of the shorter panel member 64 may be distributed uniformly among the optical fiber ends at one end of two of the longer panel members 62 so the same two light sources may be used to light the shorter panel member as well as one of the ends of two of the longer panel members. However, it should be understood that any number of infrared light sources may be used to light one or both ends of the panel members.

All of the infrared light sources 66 of the FIG. 5 embodiment may be plugged into a single control box 75 which may include a power source and circuitry similar to that shown in FIG. 4 for controlling the operation of the device. Also, if desired, another marker of a different color scheme that does not include any light emitting panel members may be provided on the opposite side of the mat so the mat can be flipped over for use as a marker during the daytime.

Although the invention has been shown and described with respect to certain embodiments, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein illustrated exemplary embodiments of the invention. Also, all of the disclosed functions may be computerized and automated as desired. In addition, while a particular feature of the invention may have been disclosed with respect to only one embodiment, such feature may be combined with one or more other features as may be desired and advantageous for any given or particular application.

What is claimed is:

1. An infrared identification device for identification at night when viewed through night vision equipment comprising a light emitting panel member, at least one infrared light source optically coupled to the panel member for supplying infrared light to the panel member for conduction within the panel member and emission from a light emitting surface area on one side of the panel member, and a power source for the light source.

2. The device of claim 1 further comprising a controller means for controlling operation of the device, and a detector means for receiving a signal and transmitting the signal to the controller means to cause the light source to emit a signal response.

3. The device of claim 2 wherein the detector means receives and transmits the received signal to the controller means only when the device is in an interrogation mode with the light source turned off.

4. The device of claim 3 wherein the controller means only activates the light source while in the interrogation mode when the received signal is of a preset sequence, frequency or code.

5. The device of claim 3 wherein the controller means only activates the light source for a short duration in response to the received signal when the device is in the interrogation mode.

6. The device of claim 3 wherein the controller means causes the light source to emit an identifying signal in response to a preset received signal when in the interrogation mode.

7. The device of claim 2 wherein the detector means is an infrared detector that detects infrared light received by the panel member from an external source when the light source is turned off.

8. The device of claim 2 wherein the detector means is a radio frequency detector.

9. The device of claim 1 further comprising a first control button means for turning the light source on and selecting different brightness modes of the light source, and a second control button means for selecting a constant on mode or different blinking modes of the light source while in any of the brightness modes.

10. The device of claim 9 wherein either or both control button means are operative to turn the light source off by activating either or both control button means for a preset time interval.

11. The device of claim 1 further comprising a controller means that is programmable to cause the light source to emit different light patterns including custom blinking light patterns.

12. The device of claim 1 wherein the light source is operable in different output modes, further comprising a visual indicator lamp means that emits visual light signals that mimic the different output modes of the light source.

13. The device of claim 12 wherein the power source is a battery power source, and the indicator lamp means also functions as a low battery indicator by emitting a different visual signal than the signals mimicking the different output modes of the light source when the remaining battery life drops below a predetermined level.

14. The device of claim 1 further comprising a controller means for controlling operation of the device, the controller means, the light source and the power source being housed in a housing connected to one end of the panel member.

15. The device of claim 1 further comprising a controller means for controlling operation of the device that is programmable from an external unit through a detector means or through a direct connection to the controller means.

16. The device of claim 1 further comprising a protective fabric cover for the panel member, the cover including a fabric layer overlying the light emitting surface area of the panel member that allows infrared light rays to penetrate the fabric layer without significant loss.

17. The device of claim 16 further comprising a heavier fabric layer covering the opposite side of the panel member that blocks out infrared light rays, wherein the heavier fabric layer extends around opposite side edges of the panel member and overlaps opposite side edges of the fabric layer overlying the light emitting surface area where the two fabric layers are secured together to form a window surrounding the light emitting surface area for penetration by the infrared light rays.

18. The device of claim 16 further comprising a housing for the light source and power source, the fabric cover having one end connected to the housing, the one end being open for extension of a light input end of the panel member out through the open end to expose the light input end to the light source within the housing.

19. The device of claim 18 wherein the panel member is comprised of one or more layers of optical fibers that are bundled together at the light input end by a connector that is received in the housing in close proximity to the light source.

20. The device of claim 19 wherein the one end of the fabric cover is notched for receipt of the connector at the light input end of the panel member.

21. The device of claim 18 wherein the one end of the fabric cover has holes that are hooked over posts in the housing to secure the one end of the fabric cover to the housing.

22. The device of claim 18 further comprising a D ring attached to the other end of the fabric cover.

23. The device of claim 22 further comprising another D ring on the housing.

24. The device of claim 18 further comprising hook fasteners attached to the housing and to an exterior surface of the fabric cover covering the other side of the panel member.

25. The device of claim 16 wherein the panel member and the protective fabric cover are flexible to permit the panel member to conform to different shaped surfaces.

26. The device of claim 25 further comprising a flexible back reflector within the fabric cover adjacent the other side of the panel member.

27. An infrared identification device for identification at night when viewed through night vision equipment comprising a plurality of light emitting panel members attached to a mat, infrared light sources attached to the mat, the infrared light sources being optically coupled to the panel members for supplying infrared light to the panel members for conduction within the panel members and emission from light emitting surface areas on the panel members, and a power source for the light sources.

28. The device of claim 27 further comprising a controller means for controlling operation of the device, and a control box containing the power source and the controller means, all of the infrared light sources being connectable to the controller means and the power source inside the control box.

29. The device of claim 27 wherein at least three light emitting panel members are arranged in a triangle on one side of the mat, and one or more of the infrared light sources are located adjacent one or both ends of each of the panel members for supplying infrared light to the panel members.

30. The device of claim 29 wherein two infrared light sources are located adjacent each corner of the triangle for directing infrared light into respective ends of each of the panel members.

31. The device of claim 30 further comprising a shorter light emitting panel member extending inwardly from one corner of the triangle to provide a directional arrow.

32. The device of claim 31 wherein the panel members of the triangle are comprised of one or more layers of optical fibers having optical fiber ends at both ends of the respective panel members that are bundled together and in close proximity to at least one of the light sources, and the shorter panel member is comprised of one or more layers of optical fibers having optical fiber ends at one end that are distributed among the optical fiber ends at one end of two of the panel members of the triangle so the same light sources that light the one end of the two panel members of the triangle also light the one end of the shorter panel member.

* * * * *